(12) United States Patent  (10) Patent No.: US 9,076,609 B2
Nakajima                   (45) Date of Patent:    Jul. 7, 2015

(54) TOUCH INPUT DEVICE (71) Applicant: FUJITSU COMPONENT LIMITED, Tokyo (JP)

(72) Inventor: Takashi Nakajima, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 198 days.

(21) Appl. No.: 13/795,393

(22) Filed: Mar. 12, 2013

(65) Prior Publication Data

US 2013/0277192 A1    Oct. 24, 2013

(30) Foreign Application Priority Data

Apr. 19, 2012 (JP) ................................. 2012-095821

(51) Int. Cl.
*G06F 3/045* (2006.01)
*G06F 3/044* (2006.01)
*H01H 13/52* (2006.01)

(52) U.S. Cl.
CPC ............... *H01H 13/52* (2013.01); *G06F 3/045* (2013.01)

(58) Field of Classification Search
CPC .......... H01H 13/703; H01H 2217/028; H01H 2215/004; G06F 3/044; G06F 3/045
USPC ....................................................... 345/104
See application file for complete search history.

(56) References Cited

U.S. PATENT DOCUMENTS

| 8,222,970 | B2* | 7/2012 | Inoue et al. | 333/133 |
| 8,345,016 | B2* | 1/2013 | Amemiya | 345/173 |
| 2003/0122792 | A1 | 7/2003 | Yamamoto et al. | |
| 2005/0099403 | A1* | 5/2005 | Kraus et al. | 345/173 |
| 2011/0157065 | A1* | 6/2011 | Murata et al. | 345/173 |
| 2013/0194181 | A1* | 8/2013 | Nakajima et al. | 345/157 |
| 2013/0265249 | A1* | 10/2013 | Nakajima | 345/173 |

FOREIGN PATENT DOCUMENTS

| JP | 9-305296 | 11/1997 |
| JP | 2002-202855 | 7/2002 |
| JP | 2010-146206 | 7/2010 |

OTHER PUBLICATIONS

Patent Abstracts of Japan, Publication No. 2002-202855, Published Jul. 19, 2002.
Patent Abstracts of Japan, Publication No. 09-305296, Published Nov. 28, 1997.
Patent Abstracts of Japan, Publication No. 2010-146206, Published Jul. 1, 2010.

* cited by examiner

*Primary Examiner* — Renee Luebke
*Assistant Examiner* — Ahmed Saeed
(74) *Attorney, Agent, or Firm* — Staas & Halsey LLP (57) ABSTRACT

A touch input device includes: a film that extends from a bulging portion bulging upward to a flat surface; a first detection region that is formed in the bulging portion and detects coordinates in a first direction and a second direction intersecting with the first direction in response to a touch to a surface of the film by an object; and a second detection region that detects a touch without detecting the coordinates in response to a touch to the surface by the object in a region other than the first detection region.

12 Claims, 10 Drawing Sheets

TOUCH INPUT DEVICE

CROSS-REFERENCE TO RELATED APPLICATION

This application is based upon and claims the benefit of priority of the prior Japanese Patent Application No. 2012-095821, filed on Apr. 19, 2012, the entire contents of which are incorporated herein by reference.

FIELD

A certain aspect of the embodiments discussed herein is related to a touch input device.

BACKGROUND

In recent years, the expansion of the market of information communication devices and business terminals expands a demand for touch input devices such as touch panels and touch pads capable of easily detecting coordinates. There has been known a touch input device including a dome-shaped bulging portion protruding upward in a touch surface as disclosed in Japanese Patent Application Publication Nos. 2002-202855, 9-305296, and 2010-146206.

SUMMARY OF THE INVENTION

According to an aspect of the present invention, there is provided a touch input device including: a film that extends from a bulging portion bulging upward to a flat surface; a first detection region that is formed in the bulging portion and detects coordinates in a first direction and a second direction intersecting with the first direction in response to a touch to a surface of the film by an object; and a second detection region that detects a touch without detecting the coordinates in response to a touch to the surface by the object in a region other than the first detection region.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

DETAILED DESCRIPTION

As described previously, there has been known a touch input device including a dome-shaped bulging portion protruding upward in a touch surface. The touch input device having a dome-shaped structure protruding upward provides a stereoscopic operational feeling to a user. However, the input touch device preferably has a switch function to improve operability.

Hereinafter, a description will be given of embodiments of the present invention with reference to the drawings.

[First Embodiment]

Figure 1A:
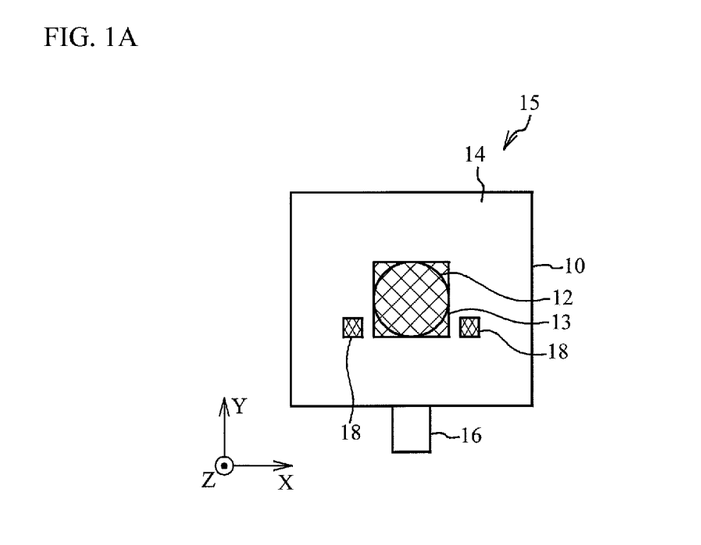
FIG. 1A and FIG. 1B are a plan view and a perspective view of a touch portion of a touch input device in accordance with a first embodiment, respectively.
Figure 1B:
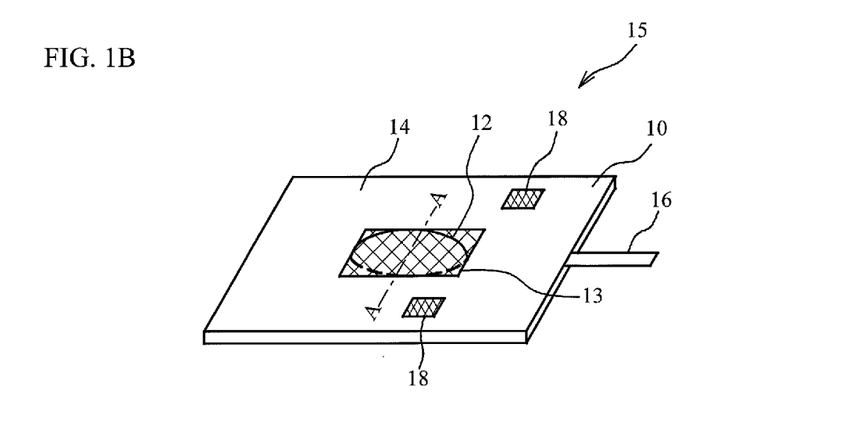

FIG. 1A and FIG. 1B are a plan view and a perspective view of a touch portion of a touch input device in accordance with a first embodiment respectively. A touch portion 15 is covered with a film 10. The film 10 extends from a bulging portion 12 bulging upward to a flat surface 14. A first detection region 13 and second detection regions 18 are formed on a surface of the film 10. The first detection region 13 is formed in the bulging portion 12, and the second detection regions 18 are formed in the flat surface. The first detection region 13 detects coordinates in an X direction (first direction) and a Y direction (second direction) intersecting with the X direction in response to a touch of an object such as a finger thereto. The first detection region 13 may be located in the bulging portion 12, but not in the flat surface 14, or the first detection region 13 may be located in the bulging portion 12 and the flat surface 14. The second detection regions 18 detect a touch without detecting the coordinates in response to a touch to the surface of the film 10 by an object in a region other than the first detection region 13. A cable 16 for inputting and outputting a signal is coupled to the film touch portion 15.

Figure 2:
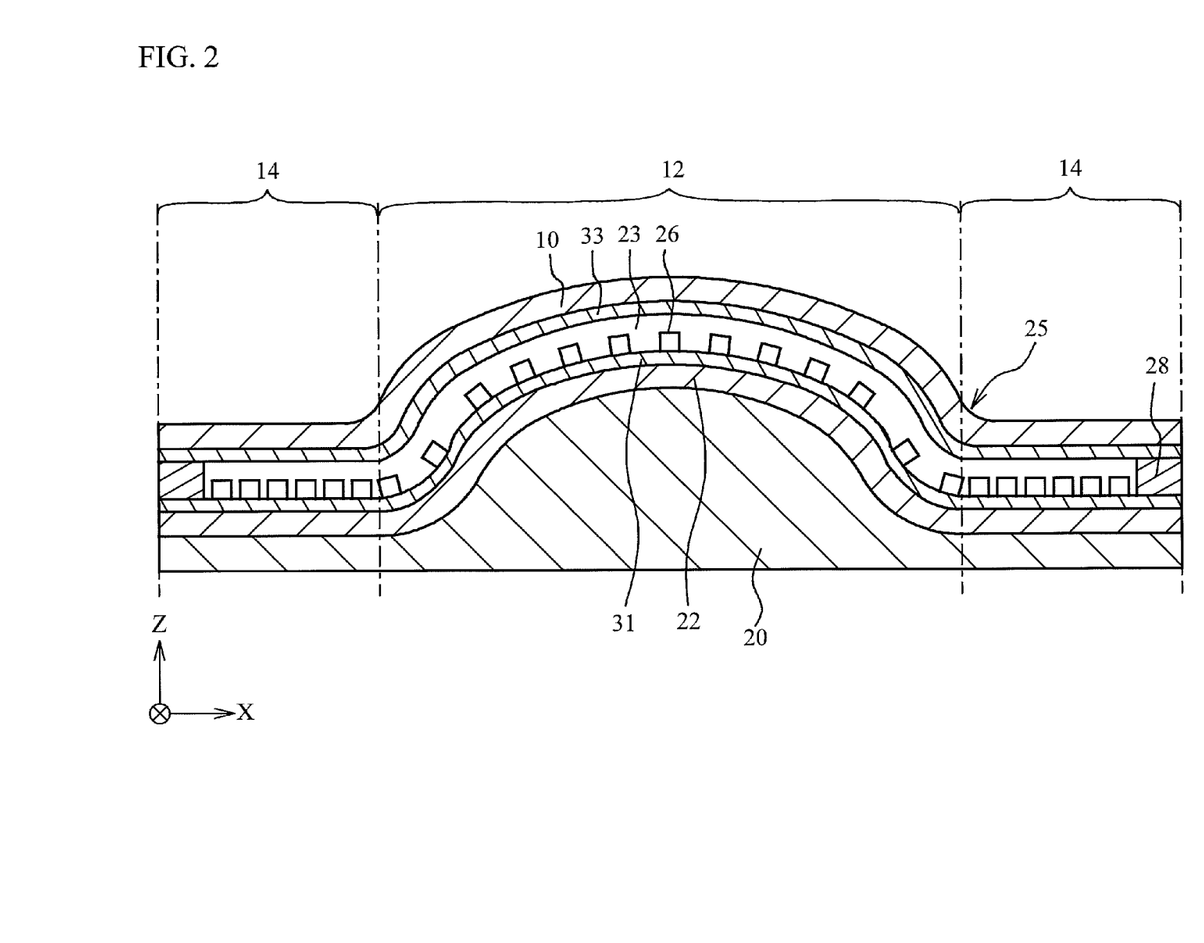
FIG. 2 is a cross-sectional view taken along line A-A in FIG. 1B.

FIG. 2 is a cross-sectional view taken along line A-A in FIG. 1B. The touch portion 15 is formed by stacking a resin pedestal 20, a lower film 22, a lower conductive film 31, dot spacers 26, an upper conductive film 33, and the upper film 10. The lower film 22 is located on the resin pedestal 20, and the lower conductive film 31 is located on the lower film 22. A film may be used instead of the resin pedestal 20. The dot spacers 26 are located apart from each other, and the upper conductive film 33 is located apart from the dot spacers 26. The lower conductive film 31 and the upper conductive film 33 are attached to each other by an adhesive member 28. An air-space 23 is formed between the lower conductive film 31 and the upper conductive film 33.

The resin pedestal 20 is made of a material such as plastic that hardly deforms. The lower film 22 and the upper film 10 are, for example, transparent films, and may be made of polyethylene terephthalate. The lower conductive film 31 and the upper conductive film 33 are, for example, transparent conductive films, and may be made of ITO (indium tin oxide). The dot spacers 26 are, for example, insulative materials, and may be made of an acrylic resin. The adhesive member 28 is a double-sided tape for example.

The first upper conductive film 33 normally does not contact with the first lower conductive film 31 in the touch portion 15. When an object such as a finger touches the upper film 10, the upper film 10 and the upper conductive film 33 sag. The upper conductive film 33 contacts with the lower conductive film 31 through a gap between the dot spacers 26. The coordinates of the point touched by the object can be detected by detecting the position where the upper conductive film 33 contacts with the lower conductive film 31.

For example, a gap between the dot spacers 26 in the flat surface 14 is narrower than that in the bulging portion 12. This configuration allows the lower conductive film 31 to easily contact with the upper conductive film 33 in the bulging portion 12, and allows the lower conductive film 31 to hardly contact with the upper conductive film 33 in the flat surface 14 when an object such as a finger touches. As described above, the region where the gap between the dot spacers 26 is made narrower can provide a dead region in which a touch of an object is not detected even in the region where the first upper conductive film 33 and the first lower conductive film 31 are located. The dot spacers 26 may be located on at least one of an upper surface of the lower conductive film 31 and a lower surface of the upper conductive film 33.

The upper film 10 and the upper conductive film 33 have a curved part 25 in a boundary between the flat surface 14 and the bulging portion 12. This reduces a stress at the boundary, and suppresses the damage to the upper film 10 and the upper conductive film 33 due to the stress.

Figure 3:
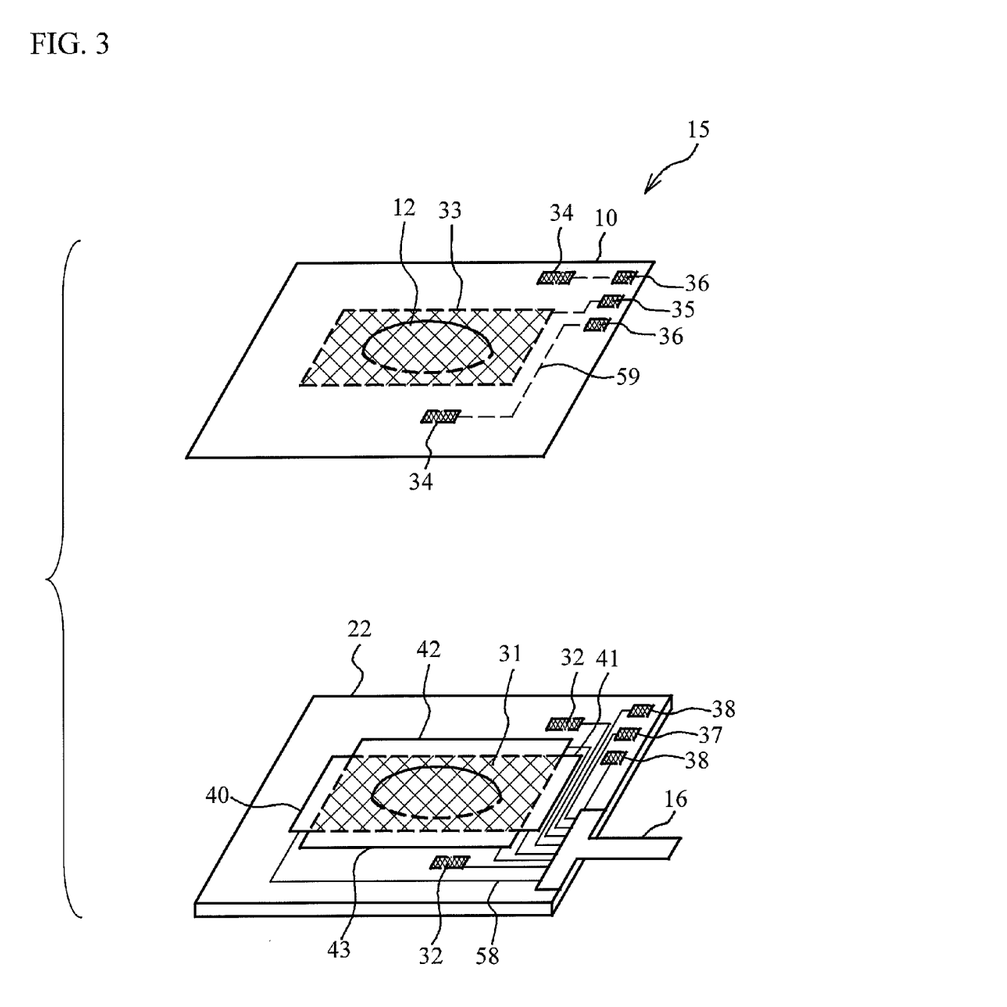
FIG. 3 is an exploded perspective view of the touch portion of the first embodiment.

FIG. 3 is an exploded perspective view of the touch portion of the first embodiment. FIG. 3 illustrates the upper film 10 and the lower film 22 separately. The upper film 10 is illustrated transparently to illustrate the first upper conductive film 33, second upper conductive films 34, upper terminals 35 and 36, and wirings 59. The first upper conductive film 33 and the second upper conductive films 34 are formed on a lower surface of the upper film 10. The first upper conductive film 33 and the second upper conductive films 34 are electrically coupled to the conductive upper terminals 35 and 36 through the conductive wirings 59 respectively. The first lower conductive film 31 and second lower conductive films 32 are formed on the upper surface of the lower film 22. Four sides of the first lower conductive film 31 include X electrodes 40 and 41 facing each other in the X direction and Y electrodes 42 and 43 facing each other in the Y direction. Lower terminals 37 and 38 for electrically connecting to the upper terminals 35 and 36 are formed on the upper surface of the lower film 22. The X electrodes 40 and 41, the Y electrodes 42 and 43, the second lower conductive films 32, and the lower terminals 37 and 38 are electrically coupled to the cable 16 through conductive wirings 58.

The first lower conductive film 31, the second lower conductive films 32, the lower terminals 37 and 38 are formed by forming a conductive film on the lower film 22 and then selectively removing the conductive film by laser etching or the like, for example. The first upper conductive film 33, the second upper conductive films 34, the upper terminals 35 and 36 can be formed in the same way.

Figure 4:
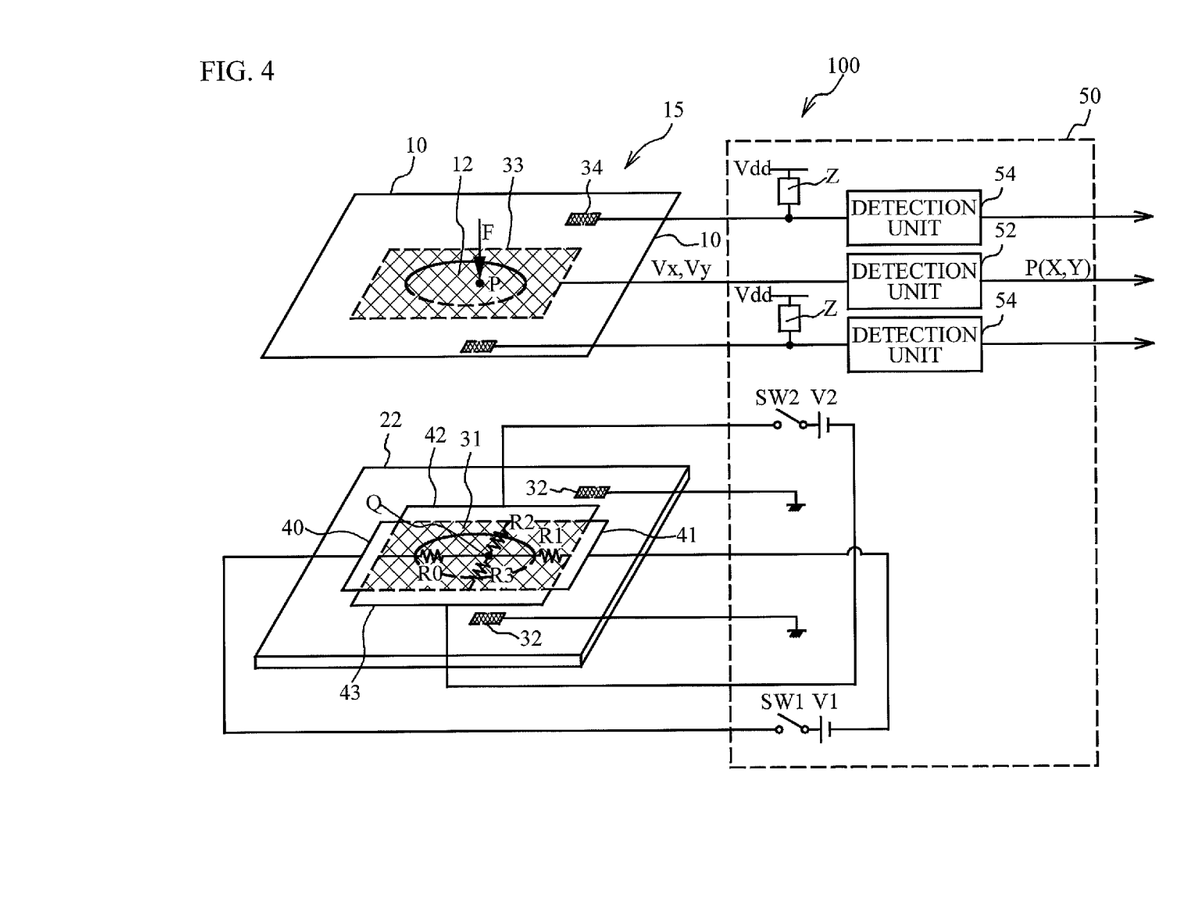
FIG. 4 is a diagram illustrating the touch input device in accordance with the first embodiment.

FIG. 4 is a diagram illustrating the touch input device in accordance with the first embodiment. A touch input device 100 includes the touch portion 15, and a controller 50. The touch portion 15 has a similar configuration to that described in FIG. 3, and thus a description thereof is omitted. The controller 50 includes detection units 52 and 54, loads Z, switches SW1 and SW2, and power sources V1 and V2. The power source V1 applies a direct voltage between the X electrodes 40 and 41. The switch SW1 is located between the power source V1 and the X electrode 40 or 41. The power source V2 applies a direct voltage between the Y electrodes 42 and 43. The switch SW2 is located between the power source V2 and the Y electrode 42 or 43.

A description will now be given of a case where an object touches the film 10 in the first detection region 13, and a stress F is applied to coordinates P in the first detection region 13 of the film 10. The first lower conductive film 31 electrically contacts with the first upper conductive film 33 at a point Q in the first lower conductive film 31. First, the switch SW2 is turned OFF, and the switch SW1 is turned ON. A voltage V1 is applied between the X electrodes 40 and 41. The first lower conductive film 31 is divided into resistors R0 and R1 in the X direction at the point Q. Thus, the electric potential of the first upper conductive film 33 has a voltage Vx that is a resistively divided voltage of the voltage V1 by the resistors R0 and R1. The detection unit 52 detects an X coordinate of the coordinates P from the voltage Vx.

Then, the switch SW1 is turned OFF, and the switch SW2 is turned ON. A voltage V2 is applied between the Y electrodes 42 and 43. The first lower conductive film 31 is divided into resistors R2 and R3 in the Y direction at the point Q. Thus, the electric potential of the first upper conductive film 31 has a voltage Vy that is a resistively divided voltage of the voltage V2 by the resistors R2 and R3. The detection unit 52 detects a Y coordinate of the coordinates P from the voltage Vy. The above described process allows the coordinates P (X, Y) of the point touched by the object in the film 10 to be detected. As described above, the first detection region 13 may be of 5-wire type resistive film type.

Figure 5:
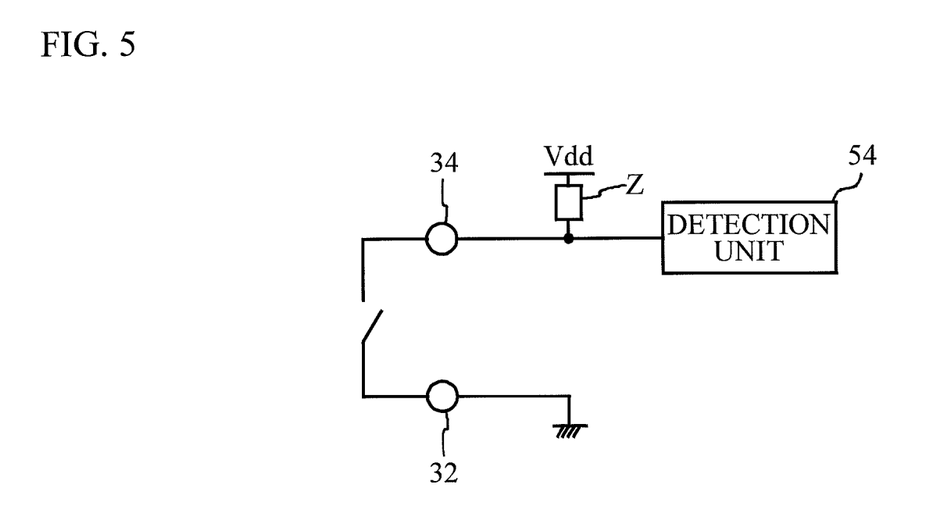
FIG. 5 is a diagram for explaining detection in a second detection region;.

FIG. 5 is a diagram for explaining detection in the second detection region 18. As illustrated in FIG. 4 and FIG. 5, the second lower conductive film 32 is electrically coupled to ground. The second upper conductive film 34 is electrically coupled to the detection unit 54. A node between the second upper conductive film 34 and the detection unit 54 is electrically connected to a power source Vdd through the load Z. When a stress is applied in the second detection region 18 of the film 10, the second upper conductive film 34 contacts with the second lower conductive film 32. This causes a ground level voltage to be input to the detection unit 54. On the other hand, when the second upper conductive film 34 does not contact with the second lower conductive film 32, a power source level voltage is input to the detection unit 54. Thus, the detection unit 54 can detect whether an object touches the film 10 in the second detection region 18. The ground and the power source Vdd may be two power sources having an electric potential different from each other.

The first embodiment forms the first detection region 13 in the bulging portion 12. This configuration provides a stereoscopic operational feeling to a user when the user moves a cursor or the like. The bulging portion 12 may have a dome shape or a polyhedral shape instead of a hemispherical shape. The second detection regions 18 are formed in the surface of the single film 10 including the first detection region 13. The second detection regions 18 do not detect coordinates, but detect a touch of an object. This configuration provides a switch function. Both the first detection region 13 and the second detection regions 18 are located in the surface of the single film, and thus the operability is improved.

The region between the first detection region 13 and the second detection regions 18 is a dead region where a touch of an object is not detected even when the object touches the surface of the film 10. This configuration enables suppression of an erroneous operation such as operating the second detection region 18 in spite of the intention to operate the first detection region 13. Therefore, the operability is further improved.

As illustrated in FIG. 3, the first upper conductive film 33 is located immediately above and apart from the first lower conductive film 31. The second upper conductive film 34 is located immediately above and apart from the second lower conductive film 32. The detection unit 52 detects coordinates based on a position where the first upper conductive film 33 contacts with the first lower conductive film 31 in the first detection region 13. The detection unit 54 detects the contact between the second upper conductive film 34 and the second lower conductive film 32 in the second detection region 18. As described above, the upper conductive film is electrically separated between the first detection region 13 and the second detection regions 18, and the lower conductive film is also electrically separated. The above configuration enables suppression of an erroneous operation such as operating the second detection region 18 in spite of the intention to operate the first detection region 13. Therefore, the operability is further improved.

Figure 6A:
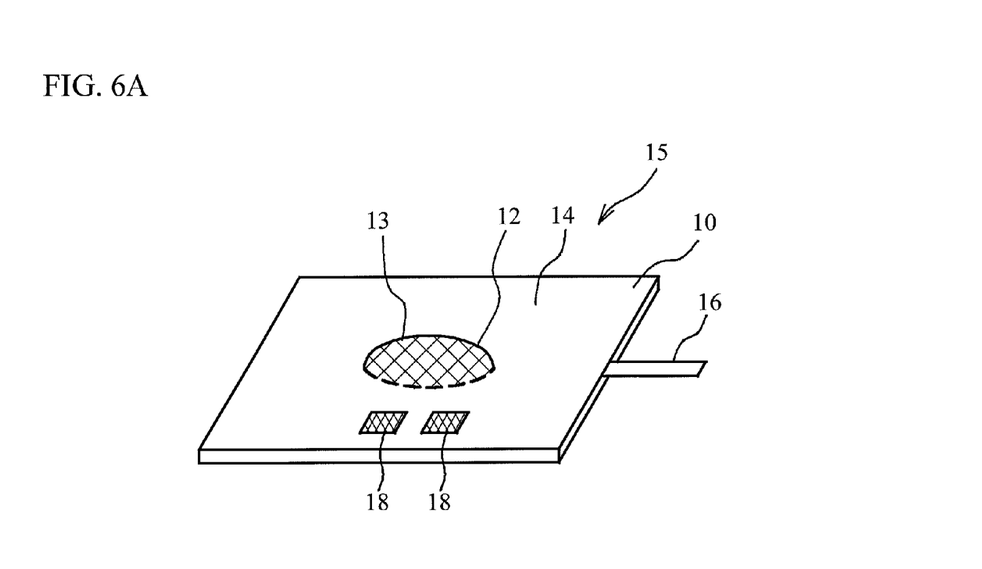
FIG. 6A is a perspective view of a touch portion of a first variation of the first embodiment.

FIG. 6A is a perspective view of a touch portion in accordance with a first variation of the first embodiment. As illustrated in FIG. 6A, the first detection region 13 may be located only in the bulging portion 12, and the second detection regions 18 may be located in the flat surface 14. Further, two or more second detection regions 18 may be arranged in the same direction with respect to the bulging portion 12.

In the first embodiment and the first variation thereof, the second detection regions 18 are located in the flat surface 14. This configuration prevents a user from operating the second detection regions 18 instead of the first detection region 13, or vice versa by mistake. For example, the first variation of the first embodiment does not provide the first detection region 13 in the flat surface 14. For example, the first detection region 13 coincides with the bulging portion 12. This configuration allows a user to distinguish between the second detection regions 18 and the first detection region 13 by a feel. The distance between the first detection region 13 and the second detection regions 18 is preferably within a range allowing a user a one-handed operation.

Figure 6B:
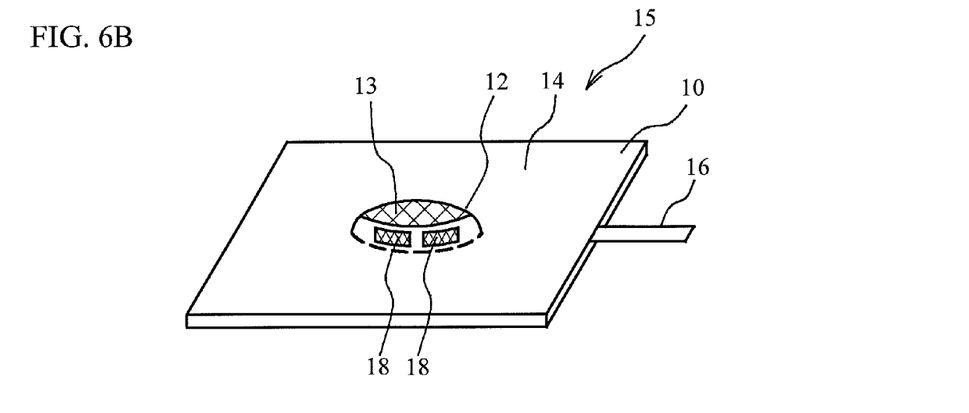
FIG. 6B is a perspective view of a touch portion of a second variation of the first embodiment.

FIG. 6B is a perspective view of a touch portion of a second variation of the first embodiment. As illustrated in FIG. 6B, the second detection regions 18 may be located in the bulging portion 12.

As described in the first and second variations of the first embodiment, when two or more second detection regions 18 are arranged in the same direction with respect to the bulging portion 12, the second detection regions 18 may be used as a mouse button.

Figure 7:
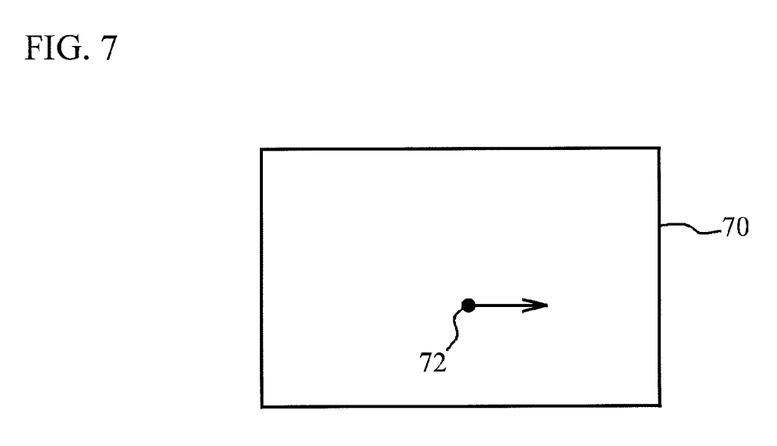
FIG. 7 is a diagram illustrating a display screen.

FIG. 7 is a diagram illustrating a display screen. As illustrated in FIG. 7, a cursor 72 is displayed on a display screen 70. The display screen 70 is a display screen of a display device to which output signals from the detection units 52 and 54 are supplied. The cursor 72 on the display screen 70 is moved with the first detection region 13. On the other hand, the second detection regions 18 can be used as mouse buttons. As described above, a cursor is moved in the X and Y directions with the bulging portion 12, and a right click and a left click of a mouse can be achieved with the second detection regions 18. Accordingly, a user can operate the touch input device as if he/she operates a mouse.

[Second Embodiment]

Figure 8:
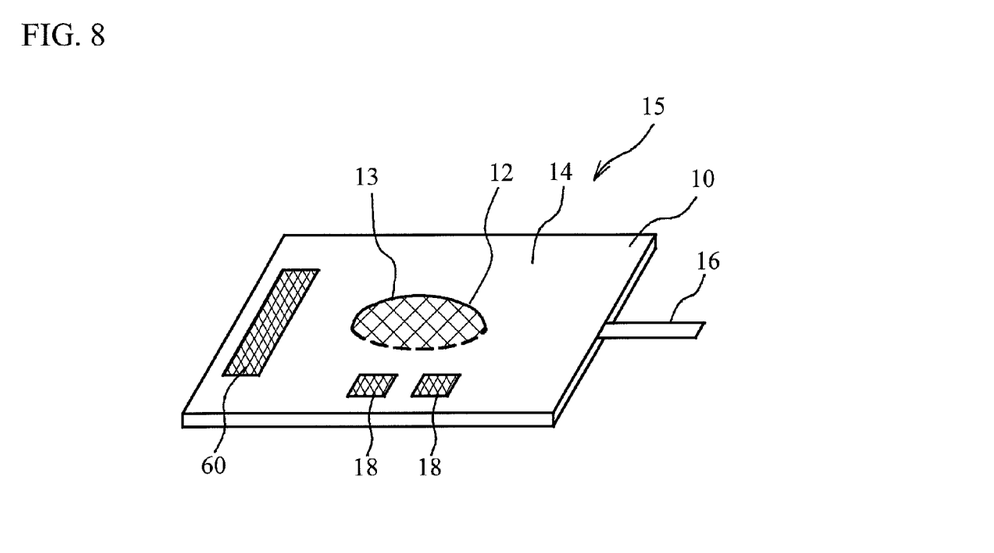
FIG. 8 is a perspective view of a touch portion in accordance with a second embodiment.

FIG. 8 is a perspective view of a touch portion in accordance with a second embodiment. As illustrated in FIG. 8, the second embodiment has the same configuration as that of the first variation of the first embodiment except that a third detection region 60 is located in the flat surface 14.

Figure 9:
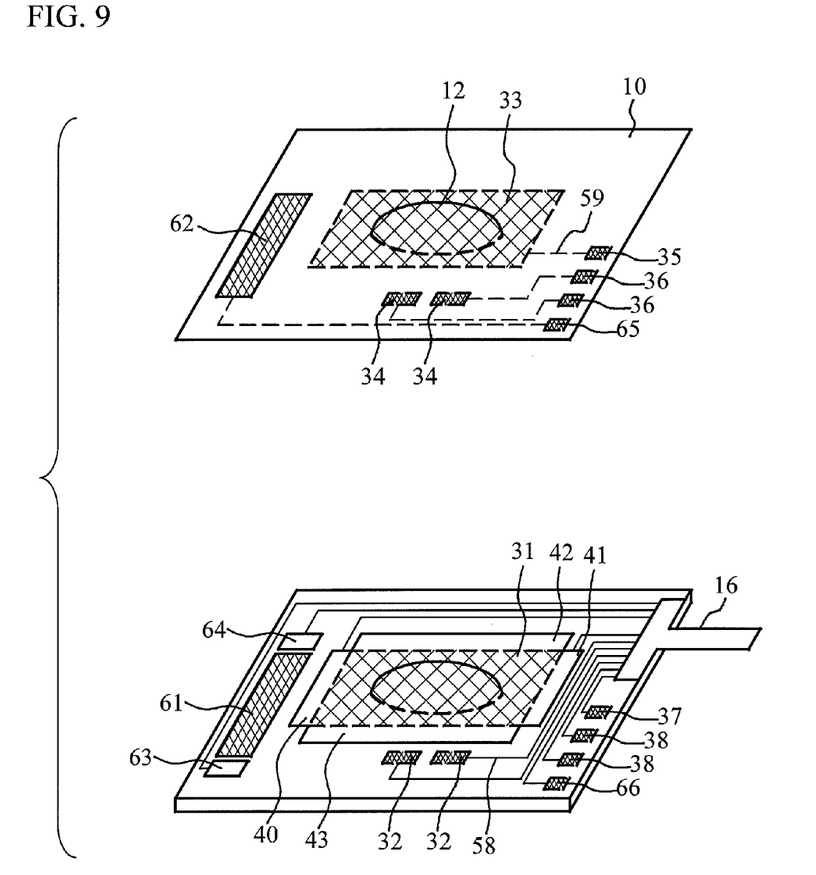
FIG. 9 is an exploded perspective view of the touch portion of the second embodiment.

FIG. 9 is an exploded perspective view of the touch portion of the second embodiment. A third upper conductive film 62 is formed on the lower surface of the film 10. The third upper conductive film 62 is coupled to a conductive upper terminal 65 through the wiring 59. A third lower conductive film 61 is formed on the upper surface of the lower film 22. Y electrodes 63 and 64 facing each other in the Y direction are located in the third lower conductive film 61. A lower terminal 66 for electrically connecting to the upper terminal 65 is located on the lower film 22. The Y electrodes 63 and 64, and the lower terminal 66 are electrically coupled to the cable 16 through the conductive wirings 58. Other configurations are the same as those illustrated in FIG. 3 of the first embodiment, and thus a description thereof is omitted.

Figure 10:
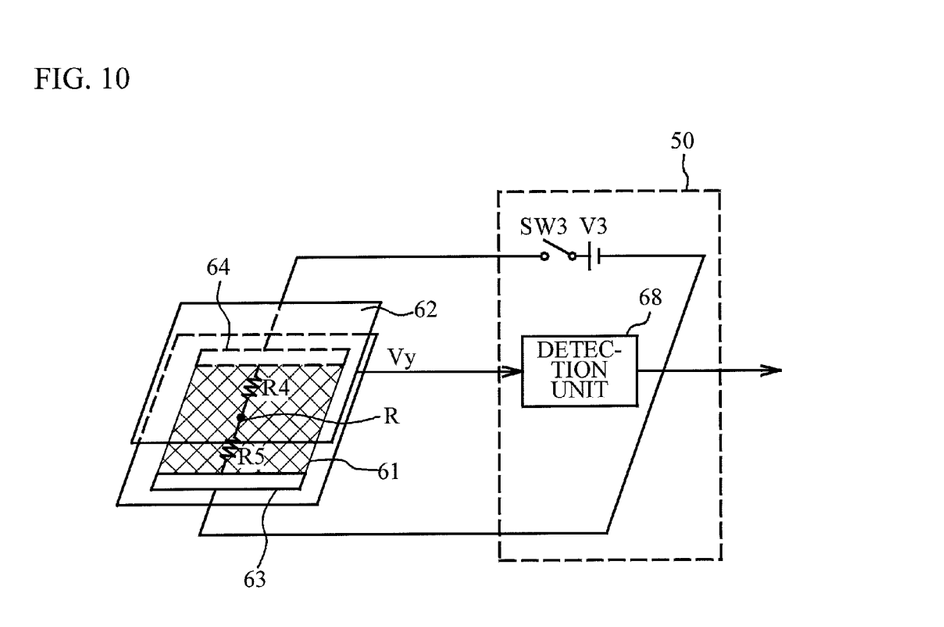
FIG. 10 is a diagram for explaining detection in a third detection region.

FIG. 10 is a diagram for explaining detection in the third detection region. The controller 50 includes a switch SW3 and a power source V3. The power source V3 applies a direct voltage between the Y electrodes 63 and 64. The switch SW3 is located between the power source V3 and the Y electrode 63 or 64. A description will be given of a case where an object touches the film 10 in the third detection region 60. The third lower conductive film 61 electrically contacts with the third upper conductive film 62 at a point R in the third lower conductive film 61. First, the switch SW3 is turned ON. A voltage V3 is applied between the Y electrodes 63 and 64. The third lower conductive film 61 is divided into resistors R4 and R5 in the Y direction at the point R. Thus, the electric potential of the third upper conductive film 62 has a voltage Vy that is a resistively divided voltage of the voltage V3 by the resistors R4 and R5. A detection unit 68 detects a Y coordinate of the point R from the voltage Vy.

As described above, the third detection region 60 is a 3-wire type resistive film touch panel. In FIG. 10, the third detection region 60 detects a coordinate in the Y direction, but the third detection region 60 can detect a coordinate in one arbitrary direction. As described above, the third detection region 60 may be of 3-wire type resistive film type.

The second embodiment configures the third detection region 60 to detect a coordinate in one direction in response to a touch to the surface of the film 10 by an object in a region other than the first detection region 13 and the second detection region 18. The third detection region 60 can be used as, for example, a slide volume for setting brightness of the display screen or a movement amount of a cursor. As described above, the provision of the third detection region 60 capable of detecting a coordinate in one direction can improve the user's operability.

A region between the third detection region 60 and the first detection region 13 and second detection regions 18 is configured to be a dead region. This configuration enables suppression of an erroneous operation such as operating the third detection region 60 in spite of the intention to operate the first detection region 13 or the second detection region 18.

The first through second embodiments mainly describe touch panels, but are applicable to touch pads. The 5-wire resistive touch panel has been described, but the first through second embodiments are applicable to a touch panel or touch pad of another type such as a capacitive touch panel or touch pad.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:
1. A touch input device comprising:
    a film that extends along a portion bulging upward and a flat surface;

a first detection region at the bulging portion that detects coordinates in a first direction, and a second direction intersecting with the first direction, in response to a touch to a surface of the film by an object;
a second detection region that detects, without detecting the coordinates, a touch to the surface of the film by the object,
wherein said second detection region is a region other than the first detection region;
a first lower conductive film in the first detection region;
a first upper conductive film in the first detection region and immediately above and apart from the first lower conductive film;
a second lower conductive film in the second detection region and electrically isolated from the first lower conductive film;
a second upper conductive film in the second detection region and immediately above and apart from the second lower conductive film and electrically isolated from the first upper conductive film.

2. The touch input device according to claim 1, wherein the first lower conductive film, the second lower conductive film, the first upper conductive film and the second upper conductive film are not located in a region between the first detection region and the second detection region.

3. The touch input device according to claim 1, further comprising:
a first detection unit that detects the coordinates from a position at which the first upper conductive film contacts with the first lower conductive film in the first detection region; and
a second detection unit that detects a contact between the second upper conductive film and the second lower conductive film in the second detection region.

4. The touch input device according to claim 1, further comprising:
a third detection region that detects a coordinate in one direction in response to a touch to the surface of the film by the object in a region other than the first detection region and the second detection region.

5. The touch input device according to claim 1, wherein the second detection region is located in the flat surface.

6. The touch input device according to claim 5, wherein the first detection region is not located in the flat surface.

7. The touch input device according to claim 1, wherein the second detection region is located in the bulging portion.

8. The touch input device according to claim 1, wherein the first detection region is used to move a cursor on a display screen, and the second detection region is used as a mouse button.

9. The touch input device according to claim 1, further comprising:
a pair of first electrodes located at both sides in the first direction of the first lower conductive film and connected to the first lower conductive film; and
a pair of second electrodes located at both sides in the second direction of the first lower conductive film and connected to the first lower conductive film.

10. The touch input device according to claim 9, further comprising:
a first detection unit that detects the coordinates from a first voltage of the first upper conductive film when a first applied voltage is applied between the pair of first electrodes and a second voltage of the first upper conductive film when a second applied voltage is applied between the pair of second electrodes; and
a second detection unit that detects a contact between the second upper conductive film and the second lower conductive film in the second detection region.

11. The touch input device according to claim 9, further comprising:
a third detection region that detects a coordinate in one direction in response to a touch to the surface of the film by the object in a region other than the first detection region and the second detection region;
a third lower conductive film located in the third detection region and electrically isolated from the first lower conductive film and the second lower conductive film; and
a third upper conductive film located in the third detection region immediately above and apart from the third lower conductive film and electrically isolated from the first upper conductive film and the second upper conductive film.

12. The touch input device according to claim 10, further comprising:
a third detection region that detects a coordinate in one direction in response to a touch to the surface of the film by the object in a region other than the first detection region and the second detection region;
a third lower conductive film located in the third detection region and electrically isolated from the first lower conductive film and the second lower conductive film;
a third upper conductive film located in the third detection region immediately above and apart from the third lower conductive film and electrically isolated from the first upper conductive film and the second upper conductive film;
a pair of third electrodes located at both sides in the one direction of the third lower conductive film and connected to the third lower conductive film; and
a third detection unit that detects the coordinate in the one direction from a third voltage of the third upper conductive film when a third applied voltage is applied between the pair of third electrodes.

* * * * *